(12) United States Patent
Valensa et al.

(10) Patent No.: US 7,069,981 B2
(45) Date of Patent: Jul. 4, 2006

(54) HEAT EXCHANGER

(75) Inventors: Jeroen Valensa, New Berlin, WI (US); Michael J. Reinke, Franklin, WI (US); Mark G. Voss, Franksville, WI (US)

(73) Assignee: Modine Manufacturing Company, Racine, WI (US)

( * ) Notice: Subject to any disclaimer, the term of this patent is extended or adjusted under 35 U.S.C. 154(b) by 223 days.

(21) Appl. No.: 10/290,563

(22) Filed: Nov. 8, 2002

(65) Prior Publication Data

US 2004/0089438 A1    May 13, 2004

(51) Int. Cl.
F28F 3/00    (2006.01)
F28D 7/00    (2006.01)

(52) U.S. Cl. .................... 165/164; 165/165; 165/166

(58) Field of Classification Search ........ 165/164–168, 165/153, 157–161, 170, 145, 144
See application file for complete search history.

(56) References Cited

U.S. PATENT DOCUMENTS

| | | | | |
|---|---|---|---|---|
| 2,428,880 A | * | 10/1947 | Kintner | 165/167 |
| 2,582,871 A | * | 1/1952 | Kintner | 165/70 |
| 2,939,686 A | * | 6/1960 | Wildermuth | 165/167 |
| 4,357,991 A | * | 11/1982 | Cameron | 165/159 |
| 4,522,894 A | | 6/1985 | Hwang et al. | |
| 4,592,414 A | * | 6/1986 | Beasley | 165/76 |
| 4,667,734 A | * | 5/1987 | Langle | 165/145 |
| 4,815,534 A | | 3/1989 | Fuerschbach | |
| 5,222,551 A | * | 6/1993 | Hasegawa et al. | 165/167 |
| 5,429,183 A | * | 7/1995 | Hisamori et al. | 165/134.1 |
| 5,832,743 A | * | 11/1998 | Adamovsky | 62/515 |
| 6,032,729 A | | 3/2000 | Nishishita et al. | |
| 6,182,748 B1 | | 2/2001 | Brost et al. | |
| 6,244,334 B1 | | 6/2001 | Wu et al. | |
| 6,629,561 B1 | * | 10/2003 | Halt et al. | 165/167 |
| 2002/0004152 A1 | | 1/2002 | Clawson et al. | |
| 2002/0007595 A1 | | 1/2002 | Maier-Roeltgen et al. | |
| 2002/0083646 A1 | | 7/2002 | Deshpande et al. | |

FOREIGN PATENT DOCUMENTS

| | | |
|---|---|---|
| DE | 19716845 | 10/1998 |
| EP | 0067799 | 12/1982 |
| JP | 6222992 | 1/1987 |
| JP | 2279989 | 11/1990 |
| JP | 8254398 | 10/1996 |
| WO | WO 00/72954 | 12/2000 |
| WO | WO 02/088022 | 11/2002 |

* cited by examiner

*Primary Examiner*—Tho Duong
(74) *Attorney, Agent, or Firm*—Wood, Phillips, Katz, Clark & Mortimer (57) ABSTRACT

A heat exchanger (50) is provided for transferring heat between first and second fluids (52) and (54) having a maximum operating mass flow rate through the heat exchanger (50) and mass flow rates that are substantially proportional to each other. The heat exchanger (50) provides essentially constant outlet temperatures for the first and second fluids (52,54) for all of the flow rates within the operating spectrum of the heat exchanger (50) without the use of an active control system. The heat exchanger (50) is of particular use in the fuel processing system (36) of proton exchange membrane type fuel cell systems.

4 Claims, 10 Drawing Sheets

Fig. 1

ACTIVE CONTROL FUEL CELL SYSTEM (PRIOR ART)

GAS TEMPERATURE PROFILE FOR A SIX-PASS HEAT EXCHANGER

Fig. 8

6 PASS HEAT EXCHANGER

Fig. 11

HEAT EXCHANGER

FIELD OF THE INVENTION

This invention relates to heat exchangers in general and in more particular applications, to recuperative heat exchangers which find many uses in industry, including in fuel cell systems.

BACKGROUND OF THE INVENTION

Heat exchangers that transfer heat from one fluid flow to another fluid flow and wherein the mass flow rates of each of the fluid flows are substantially proportional to each other are known. Perhaps the most common example of such heat exchangers are recuperative heat exchangers that recoup or recover useful heat from the working fluid of a system as the working fluid flows through the system. One example of such a recuperative heat exchanger can be found in the fuel processing system of proton exchange membrane (PEM) type fuel cell systems. In typical fuel cell systems, a fuel, such as methane or a similar hydrocarbon, is used as the source of hydrogen for the fuel cell. This hydrocarbon must be reformed within the system prior to reaching the fuel cell in order to provide the hydrogen gas. Reforming is typically carried out by a fuel processing system through a series of catalyst-aided chemical reactions, all of which need to occur within different distinct temperature ranges. Heat exchangers, including recuperative heat exchangers, are used to alternately heat and cool the gas stream to the desired catalytic reaction temperatures for the process.

Figure 1:
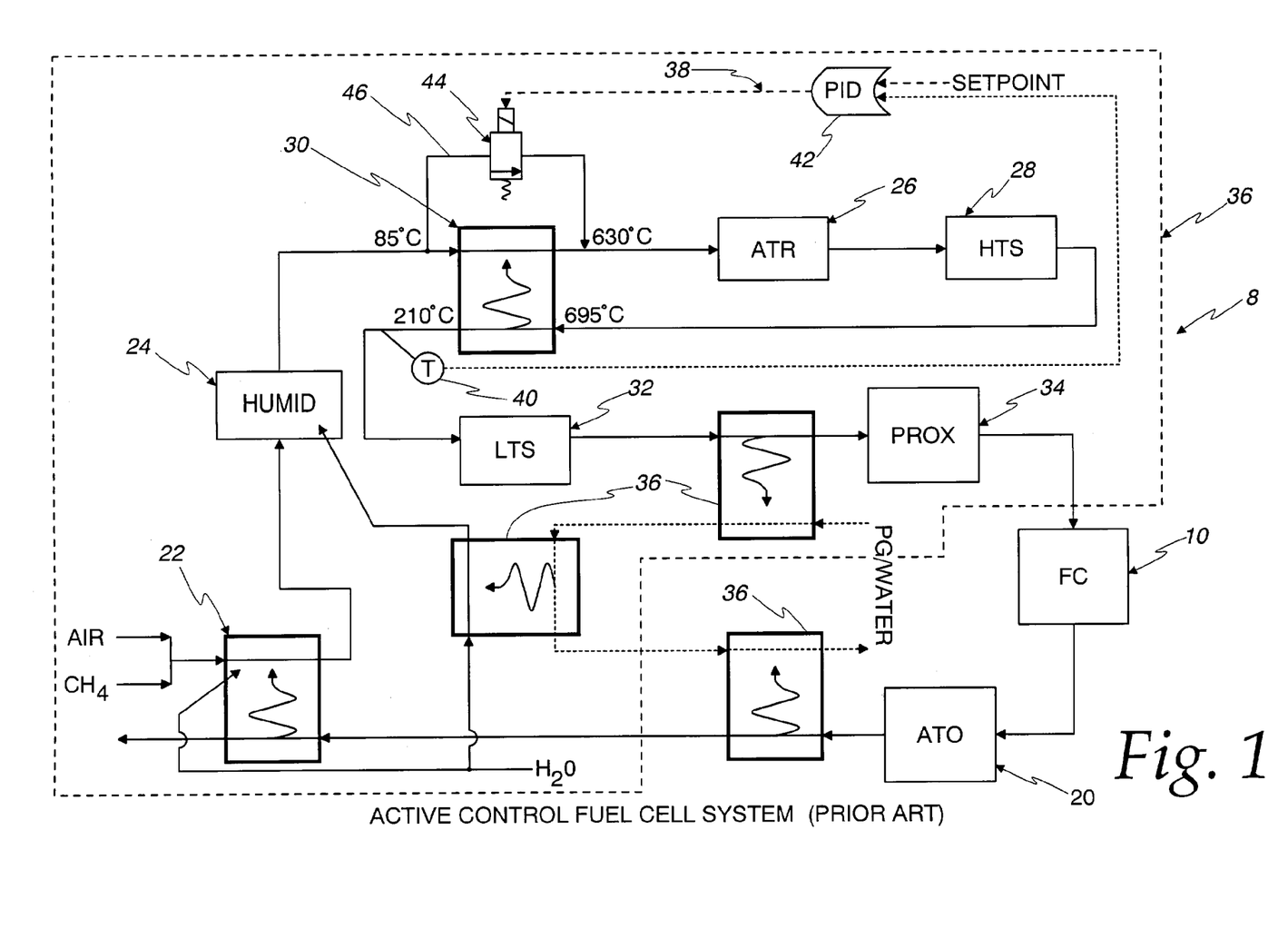
FIG. 1 is a diagrammatic representation of a prior art recuperative heat exchanger used in a fuel cell system.

One example of such fuel cell systems is shown in FIG. 1. The PEM fuel cell system 8 of FIG. 1 utilizes methane ($CH_4$) as its fuel and includes a proton exchange membrane fuel cell 10, an anode tail gas oxidizer 20, a heat exchanger 22 that transfers heat from the tail gas to the air/methane and water ($H_2O$) entering the system 8, a humidifier 24 that humidifies the humidified air/methane mixture from the heat exchanger 22, an auto-thermal reformer (ATR) 26, a high temperature water-gas shift reactor (HTS) 28 which is sometimes incorporated into the ATR 26, a recuperative heat exchanger 30 that transfers heat from the reformate produced by the ATR 26 to the humidified air/methane mixture from the humidifier 24, another water-gas shift reactor which in the illustrated example is a low temperature water-gas shift reactor (LTS) 32, and a preferential oxidizer (PROX) 34. Optionally, several other heat exchangers 36 can be added at various locations in the fuel cell system 8 to transfer heat between the various components of the fuel cell system 8. The heat exchanger 22, the humidifier 24, the recuperative heat exchanger 30, the ATR 26, the HTS 28, the LTS 32, and the PROX 34 form a fuel processing system 36 for the fuel cell system 8. It will be understood by those skilled in the art that such PEM fuel cell systems also include a cathode gas flow to the fuel cell 10, as well as the components associated with the cathode gas flow, none of which are shown in FIG. 1. It will also be understood by those skilled in the art that some fuel cell systems may incorporate a mid-temperature water-gas shift reactor in place of the LTS 32 or the HTS 28, or both.

Typically, the catalytic reaction in the ATR 26 requires an inlet gas temperature of about 500° C. to about 750° C. with a preferred temperature of approximately 630° C. The catalytic reaction in the LTS 32 requires the inlet gas flow to have a temperature in the range of about 180° C. to about 240° C. with a preferable target temperature of approximately 210° C. Because the catalytic reactions in the ATR 26 and the LTS 32 require the temperature of the incoming gas flow to be within a relatively narrow temperature range, the control of the outlet temperatures from the recuperative heat exchanger 30 is critical to the operation of the fuel cell system 8. However, as the electrical load on the fuel cell system is varied, the flow of gas through the system, including the heat exchanger 30, likewise varies, sometimes in the range of 10 to 1. Typically, the heat transfer effectiveness of the heat exchanger 30 will not be constant for a widely varying mass flow rate of the gas flow there through, and the gas temperatures exiting the heat exchangers will therefore not be held within the desired temperature range at all flow rates, unless some sort of control system is incorporated with the heat exchanger 30. The typical solution to this problem is to actively control the amount of flow which passes through the heat exchanger 30 via a bypass control system such as a feed back/bypass control system 38 as shown in FIG. 1. The control system 38 typically includes a temperature sensor 40 that monitors the temperature of the reformate gas flow exiting the heat exchanger 30 and provides the monitored temperature to a proportional-integral-derivative (PID) controller 42 that compares the monitored temperature with a set point temperature and continually adjusts a solenoid-controlled bypass valve 44 to shunt a portion of the humidified air/methane mixture around the heat exchanger 30 via a bypass flow path 46. This limits the amount of heat that can be transferred between the flow streams through the heat exchanger 30 and prevents over cooling of the reformate to the LTS 32.

While systems typified by the one described above may perform satisfactory for their intended purpose, there is always room for improvement. For example, the use of an active control system may add cost and complexity to such systems, while reducing the reliability of such systems.

SUMMARY OF THE INVENTION

It is the primary objective of the invention to provide a new and improved heat exchanger.

It is another objective of the invention to provide a recuperative heat exchanger that is suitable for use in a fuel cell system.

According to one form of the invention, a heat exchanger is provided for transferring heat between first and second fluids, with each of the first and second fluids having a maximum operating mass flow rate through the heat exchanger and the first and second fluids having mass flow rates that are substantially proportional to each other.

In accordance with one form of the invention, the heat exchanger includes a first multi-pass flow path for the first fluid, with each pass of the first flow path having a first entrance and a first exit, and a second multi-pass flow path for the second fluid, with each pass of the second flow path having a second entrance and second exit. The passes of the first and second flow paths are arranged in adjacent pairs with each pass of the first flow path paired with an adjacent pass of the second flow path. The passes are arranged so that the first fluid encounters each adjacent pair in an order that is opposite from an order in which the second fluid encounters each adjacent pair. The first and second entrances and exits for each adjacent pair are arranged relative to each other to provide a concurrent flow relationship between the first and second fluids flowing through the adjacent pair. Each adjacent pair is configured to provide a heat transfer effectiveness sufficient for the temperatures of the first and second fluids to closely approach or obtain a common temperature at the first and second exits of the adjacent pair at the maximum operating mass flow rate.

In one form, the heat exchanger includes a stack of heat exchange units defining the first and second multi-pass flow paths.

According to one form, each pass of the second flow path, in which the second fluid flows in an overall concurrent flow relationship relative to the first fluid flowing through the adjacent pass of the first flow path of the adjacent pair, is subdivided into at least two cross passes wherein the second fluid has a localized cross flow relationship relative to the first fluid in the adjacent pass.

According to one form, the heat exchanger further includes a plurality of tubes, the interiors of the tubes to define the first multi-pass flow path; and at least one baffle located relative to the exteriors of the tubes to define the second of the multi-pass flow path across the exteriors of the tubes. In a further form, the heat exchanger further includes at least one baffle located in each pass of the second multi-pass flow path to direct the second fluid in a localized cross flow relationship relative to the first fluid in the adjacent pass. In one form, the heat exchanger further includes a plurality of fins on the exterior of the tubes extending into the second multi-pass flow path.

According to one form, the stack includes a plurality of plate pairs, with each plate pair defining at least one pass of the first flow path between the plates of the plate pair and at least one pass of the second flow path between one of the plates of the plate pair and a plate of an adjacent pair.

In one form, the stack includes a plurality of bar-plate pairs, with each bar-plate pair defining two passes of the first flow path adjacent two passes of the second flow path.

In accordance with another form of the invention, a method is provided for operating a recuperative heat exchanger that transfers heat between a first fluid and a second fluid having a maximum operating mass flow rate through the heat exchanger, with the first and second fluids having mass flow rates that are substantially proportional to each other. The method includes the steps of:

a) flowing a first fluid through a first pass of a first flow path of the recuperative heat exchanger;

b) flowing a second fluid through a second pass of a second flow path of the recuperative heat exchanger, the second pass of the second flow path adjacent the first pass of the first flow path and the temperatures of the first and second fluids closely approaching or attaining a common temperature at the exit of their respective passes at the maximum operating mass flow rate;

c) flowing the first fluid through a second pass of the first flow path of the recuperative heat exchanger after the first fluid has flown through the first pass of the first flow path; and d) flowing the second fluid through a first pass of the second flow path of the recuperative heat exchanger prior to the second fluid flowing through the second pass of the second flow path, the first pass of the second flow path adjacent the second pass of the first flow path and the temperatures of the first and second fluids closely approaching or attaining a common temperature at the exit of their respective passes at the maximum operating mass flow rate.

In accordance with yet another form of the invention, a fuel processing system is provided for a proton exchange membrane type fuel cell system. The fuel processing system includes an auto-thermal reformer having an inlet connected to the system to receive a humidified air/fuel mixture therefrom and an outlet connected to the system to supply a reformate flow thereto, a water-gas shift reactor having an inlet connected to the system downstream from the auto-thermal reformer to receive the reformate flow therefrom and an outlet connected to the system to supply a reformate with a reduced carbon monoxide content thereto, and a recuperative heat exchanger including first and second flow paths, with the first flow path connected to the system upstream of the auto-thermal reformer to preheat the humidified air/fuel mixture to a desired inlet temperature range for the auto-thermal reformer and the second flow path connected to the system downstream of the auto-thermal reformer and upstream of the water-gas shift reactor to cool the reformate flow to a desired inlet temperature range for the water-gas shift reactor. The first and second flow paths are arranged relative to each other to supply the desired inlet temperature ranges for the auto-thermal reformer and the water-gas shift reactor at all flow rates within the anticipated operating spectrum of the fuel cell system without the use of an active control system.

In one form, the recuperative heat exchanger and the auto-thermal reformer are an integrated unit.

According to another form of the invention, a method is provided for operating a fuel processing system for a proton exchange membrane type fuel cell system. The method includes the steps of:

a) flowing an air/fuel mixture through a first flow path of a recuperative heat exchanger to an auto-thermal reformer located downstream of the first flow path;

b) flowing a reformate from the auto-thermal reformer through a second flow path of the recuperative heat exchanger located downstream of the auto-thermal reformer and upstream of a water-gas shift reactor;

c) providing the air/fuel mixture from the first flow path to the auto-thermal reformer within a desired catalytic temperature range for all flow rates within the operating spectrum of the fuel cell;

d) providing the reformate from the second flow path to the water-gas shift reactor within a desired catalytic temperature range for all flow rates within the operating spectrum of the fuel cell; and e) performing steps c) and d) without an active control of the recuperative heat exchanger.

According, to one aspect of the invention, an integrated unit is provided for a fuel processing system of a fuel cell system. The integrated unit includes a recuperative heat exchanger including a first flow path for an air/fuel mixture and a second flow path for a reformate, with each flow path having an entrance and an exit. The integrated unit further includes an auto-thermal reformer, preferably with at least part of the auto-thermal reformer surrounded by a portion of the recuperative heat exchanger. The auto-thermal reformer includes an inlet connected to the exit of the first flow path to receive the air/fuel mixture therefrom, and an outlet connected to the entrance of the second flow path to provide the reformate thereto.

In one form, each of the first and second flow paths are multi-pass flow paths, and at least part of the auto-thermal reformer is surrounded by a final pass of the first flow path and an initial pass of the second flow path.

Other objects and advantages will become apparent from reviewing the specification, including the appended claims and drawings.

DETAILED DESCRIPTION OF THE PREFERRED EMBODIMENTS

Figure 2:
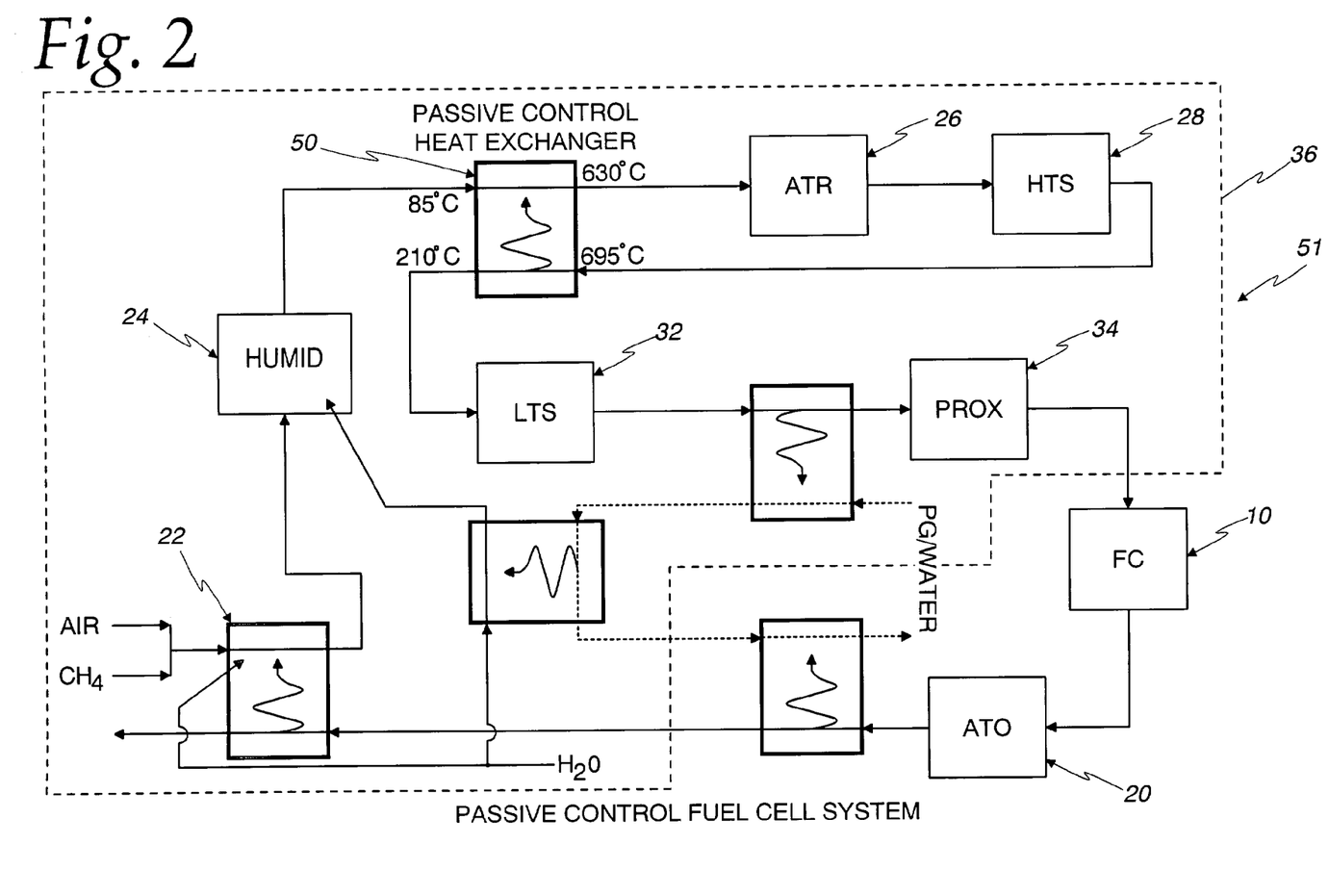
FIG. 2 is a diagrammatic illustration similar to FIG. 1, but showing a recuperative heat exchanger embodying the present invention substituted in place of the recuperative heat exchanger of FIG. 1.

FIG. 2 shows a heat exchanger 50 embodying the present invention substituted for the recuperative heat exchanger 30 and its control system 38 shown in FIG. 1 in a proton exchange membrane type fuel cell system 51. With the exception of the substitution of the heat exchanger 50 for the heat exchanger 30 and it's control system 38, the fuel cell systems 8 and 51 shown in FIGS. 1 and 2, respectively, are identical and like reference numbers represent like components. While, the heat exchanger 50 made according to the invention is shown in FIG. 2 incorporated in the fuel processing system 36 of the proton exchange membrane type fuel cell system 51, it should be understood that heat exchangers according to the invention can and will find use in other applications. Accordingly, no limitation to use of the heat exchangers according to the invention with fuel cell systems or with particular types of fuel cell systems is intended, unless expressly recited in the claim. For example, while the fuel cell systems in FIG. 1 and FIG. 2 show a HTS 28 and a LTS 32, the heat exchanger 50 could be utilized with a fuel cell system that utilizes a mid-temperature water-gas shift reactor together with or as a replacement for the HTS 28 and/or the LTS 32.

The heat exchanger 50 shown in FIG. 2 is a desirable replacement for the heat exchanger 30 and it's associated active control 38 because the heat exchanger 50 is able to maintain an essentially constant output temperature to the ATR 26 and the LTS 32, thereby providing the appropriate catalytic reaction temperatures for the humidified air/fuel mixture (in the form of a humidified air/methane mixture) entering the ATR 26 and the reformate entering the LTS 32. More specifically, the heat exchanger 50 is able to supply the humidified air/methane mixture within the required inlet gas temperature range of about 500° C. to about 750° C. for the ATR 26 and supply the reformate within the required inlet gas temperature range of about 180° C. to about 240° C. for the LTS 32, for all the flow rates of the air/methane mixture and reformate within the operating spectrum of the fuel cell system 10. In this regard, it should be noted that the mass flow rates of the humidified air/methane and the reformate into the heat exchanger 50 are essentially proportionate to each other over the operating spectrum of the system 51. In a highly preferred embodiment, the heat exchanger 50 is able to maintain the outlet temperature of the humidified air/methane mixture directed to the ATR 26 within a 50° C. range centered on a target temperature, which in a preferred embodiment is 630° C., and maintain the outlet temperature for the reformate directed to the LTS 32 within a 40° C. temperature range centered on a target temperature, which in a preferred embodiment is approximately 210° C., for all of the mass flow rates of the humidified air/methane mixture and reformate within the operating spectrum of the fuel cell system 51. In this regard, the maximum operating mass flow rate may be up to seven times greater than the minimum operating flow rate, and in some preferred embodiments, the maximum operating mass flow rate may be up to ten times greater than the minimum flow rate. By passively providing what are essentially constant outlet temperatures over the operating spectrum of the fuel cell system 51 for both the humidified air/methane mixture and reformate, the heat exchanger 50 is able to eliminate the need for an active control scheme, such as the control system 38, thereby simplifying the fuel cell system 51 in comparison to a typical fuel cell system, such as the system 8.

Figure 3:
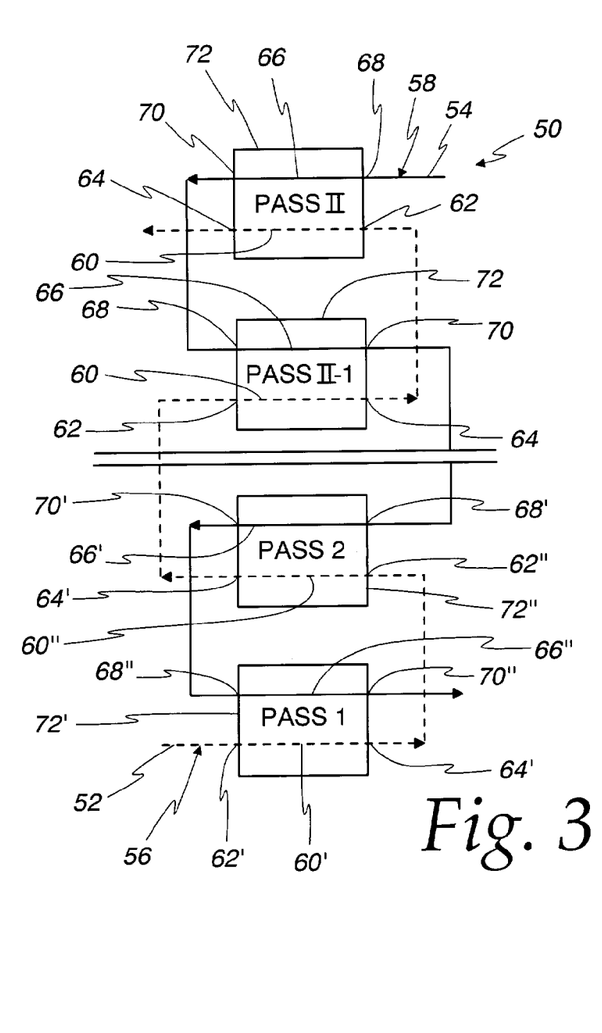
FIG. 3 is a diagrammatical illustration of a heat exchanger embodying the present invention.

FIG. 3 is a diagrammatic representation of the recuperative heat exchanger 50 for transferring heat between first and second fluid 52 and 54, which for the fuel cell system 51 of FIG. 2 are the humidified air/methane mixture and the reformate, respectively. The heat exchanger 50 includes a first multi-pass flow path 56 (shown by the dashed line in FIG. 3) for the first fluid 52, and a second multi-pass flow path 58 (shown by the solid line in FIG. 3) for the second fluid 54. Each pass 60 of the first flow path 56 has an entrance 62 and a exit 64, and each pass of 66 of the second flow path 58 has an entrance 68 and an exit 70. The passes 60 and 66 of the first and second flow paths 56 and 58 are arranged in adjacent pairs 72, with each pass 60 of the first flow path 56 paired with an adjacent pass 66 of the second flow path 58. The passes 60 and 66 are arranged so that the first fluid 52 encounters each adjacent pair 72 in an order that is opposite from an order in which the second fluid 54 encounters each adjacent pair 72. The entrances 62 and 68 and exits 64 and 70 for each adjacent pair 72 are arranged relative to each other to provide a concurrent flow relationship between the first and second fluids 52 and 54 as they flow through the adjacent pair 72. Each adjacent pair 72 is configured to provide a heat transfer effectiveness sufficient for the temperatures of the first and second fluids 52 and 54 to closely approach or obtain a common temperature at the exits 64 and 70 of the adjacent pair 72 at the maximum operating mass flow rate. Analysis has shown that the outlet temperature of the first and second fluids 52 and 54 can be held within an acceptable temperature range for operating mass flow rates that vary by a ratio of 10 to 1. It should be noted that FIG. 3 provides for up to n adjacent pairs 72 of the passes 60 and 66.

Figure 4:
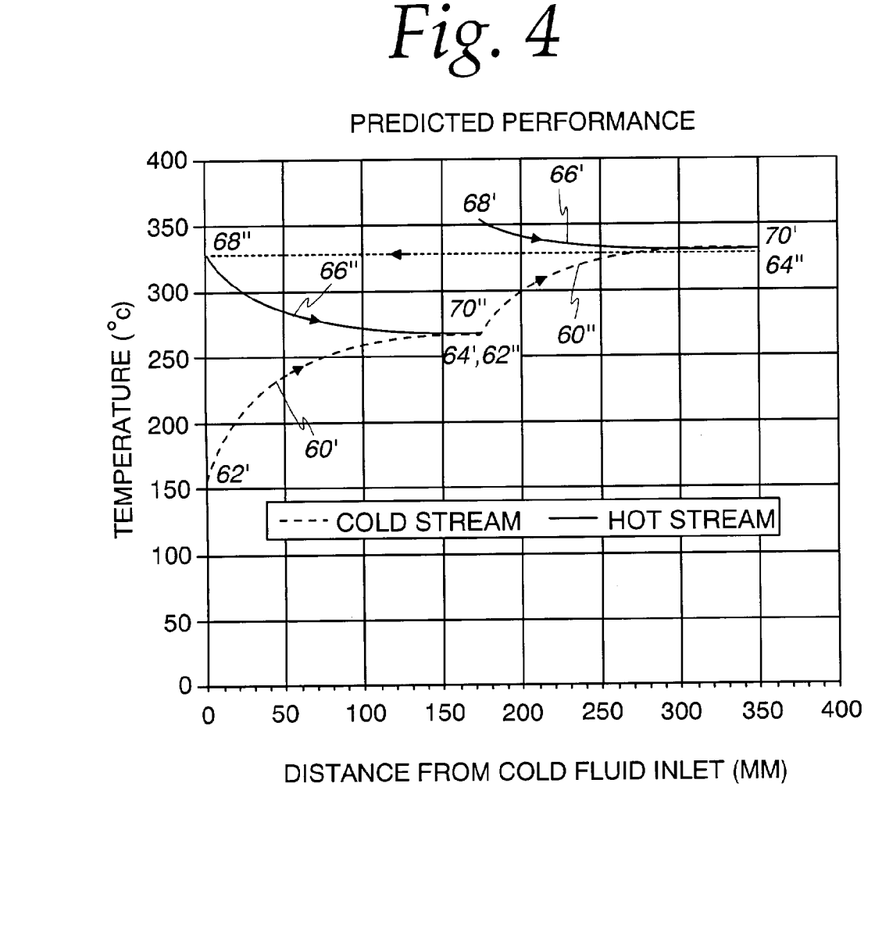
FIG. 4 is a graph illustrating the temperature versus flow path distance for the two working fluids of the heat exchanger of FIGS. 3 and 6.

The above described fluid temperature profile is perhaps best understood with reference to the graph shown in FIG. 4 in conjunction with FIG. 3. For purposes of illustration, the first fluid will be the fluid with the colder temperature when it enters the heat exchanger 50, and accordingly heat will be transferred from the second fluid 54 to the first fluid 52 so as to raise the temperature of the first fluid 52 as it passes through the heat exchanger 50 and lower the temperature of the second fluid 54 as it passes through heat exchanger 50. FIG. 4 illustrates the temperatures of the first fluid 52 and the second fluid 54 as they flow through the adjacent pairs 72' and 72" shown in FIG. 3, with a reference distance from the entrance 62' shown on the horizontal axis of the graph. It should be understood that although they are given in absolute numbers of degrees Celsius and millimeters, the temperatures and distances shown in FIG. 4 are for purposes of illustration only, showing one working example, and that the temperatures and distances for each adjacent pair 72 of a particular heat exchanger 50 will be highly dependant upon the particular parameters of each application. As seen from FIG. 4, as the first fluid 52 flows from the entrance 62' to the exit 64' and the second fluid 54 flows from the entrance 68" to the exit 70", the temperatures of the two fluids 52 and 54 closely approach or obtain a common temperature at the exits 64' and 70" of the adjacent pair 72'. Similarly, it can be seen that as the first fluid 52 and the second fluid 54 flow from their respective entrances 62" and 68' to their respective exits 64" and 70', the first and second fluids 52 and 54 again closely approach or obtain a common temperature at the exits 64" and 70' of the second adjacent pair 72". Thus, it can be seen that each pair 72', 72" "pinches" the temperatures of the first and second fluids 52 and 54 at their respective exits 64', 70" , 64", and 70'. Preferably, this fluid temperature profile is achieved by designing each pair 72 to achieve a maximum concurrent flow heat transfer effectiveness at the maximum operating mass flow rates for the first and second fluids 52 and 54, which should ensure the desired performance at all lower mass flow rates for the first and second fluids 52 and 54.

Figure 5:
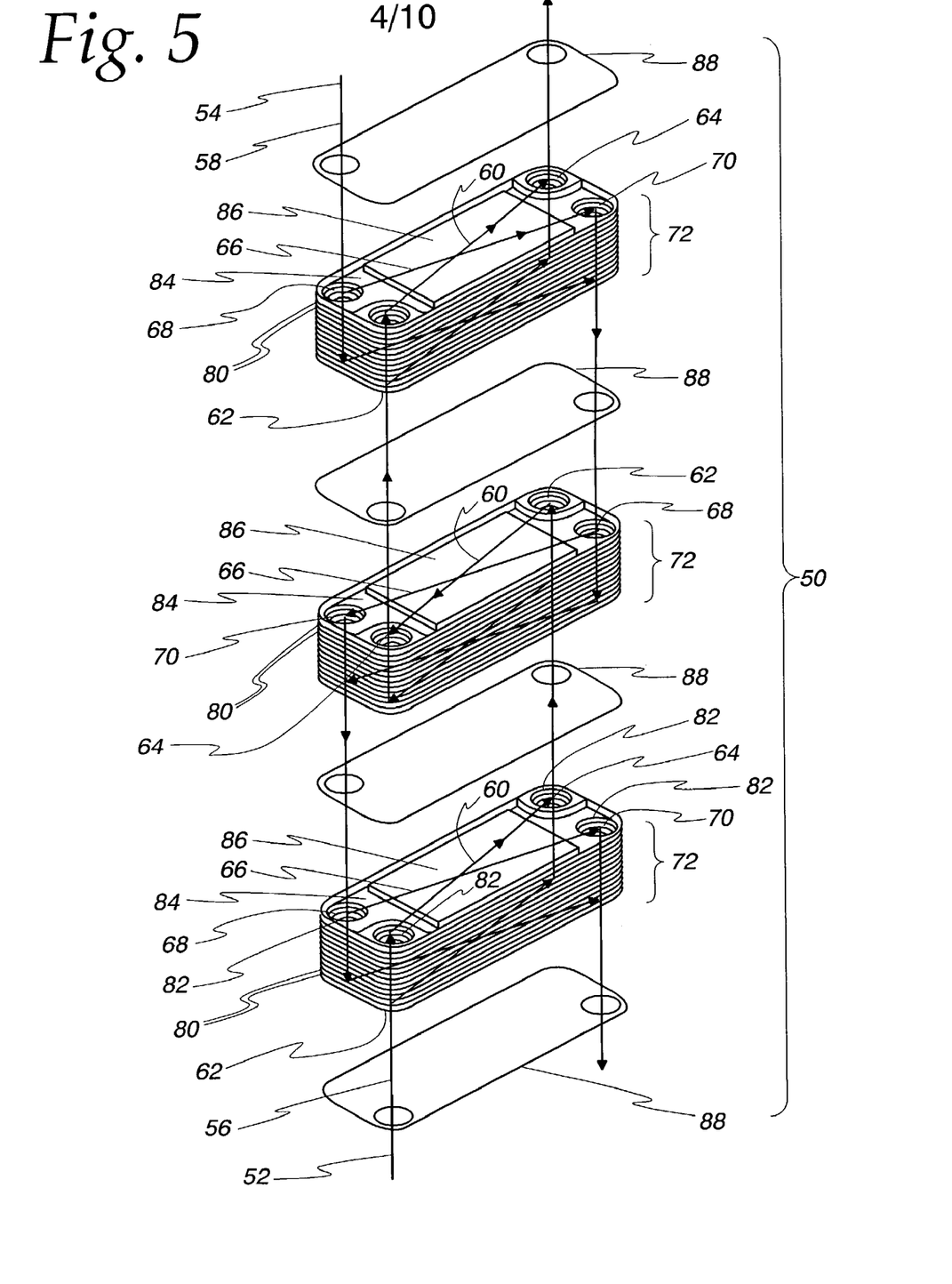
FIG. 5 is an exploded perspective view of one embodiment of a heat exchanger according to the invention.

FIG. 5 illustrates one possible construction for the heat exchanger 50 and incorporates a stack of heat exchange units 80, which can be a formed, stacked plate type design or a bar-plate type construction such as are well known in the heat exchanger industry, particularly in oil coolers. It can be seen that the heat exchanger 50 includes three adjacent pairs 72 of the passes 60 and 66 of the first and second flow paths 56 and 58, with the passes 60 and 66 arranged in a concurrent flow relationship in each adjacent pair 72, and the fluid 52 encountering each adjacent pair 72 in an order that is opposite from the order that the fluid 54 encounters each of the adjacent pairs 72. In the illustrated embodiment, each of the adjacent pairs 72 is made up of a plurality of the heat exchange units 80 in the form of formed stacked, drawn cup plates 80, each having four openings 82 at its corners that are aligned with the openings in the adjacent plates 80 and sealed thereto to form manifolds for the respective entrances 62 and 68 and exits 64 and 70 of each of the passes 60 and 66. Alternating flow chambers 84 are defined between the plates 80 for each of the passes 60 and 66. Accordingly, it should be appreciated that there are multiple parallel flow chambers 84 for each of the passes 60 and 66 in each of the adjacent pairs 72. If required, a heat transfer element such as a fin or turbulator 86 can be provided in each of the flow chambers 84. A divider plate 88 is provided between each of the adjacent pairs 72, and on the top and bottom of the topmost and bottommost adjacent pairs 72, respectively, to separate the adjacent pairs 72 and close the topmost and bottommost flow chambers 84.

Figure 6:
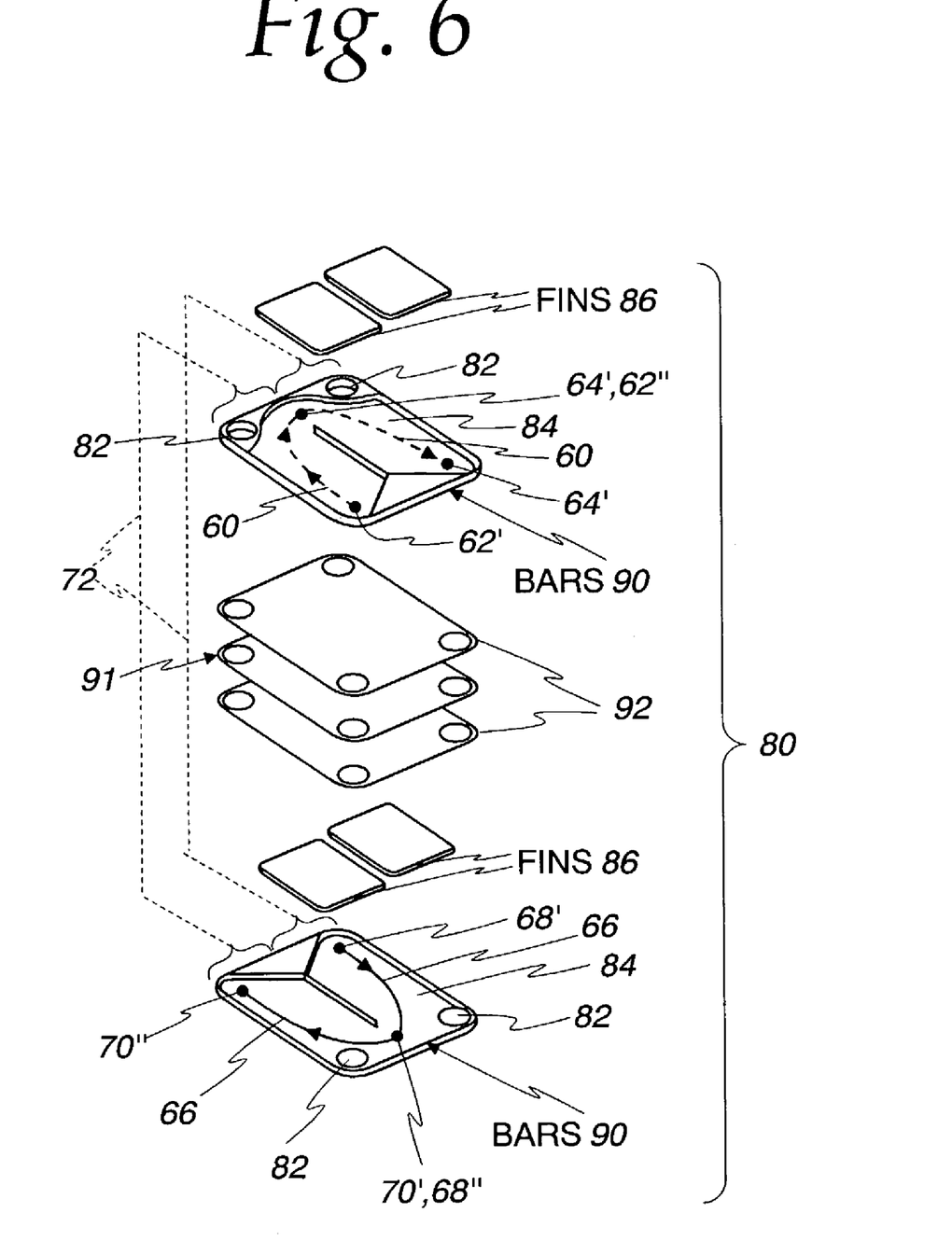
FIG. 6 is an exploded perspective view of another heat exchanger embodying the present invention.

FIG. 6 illustrates another possible construction for the heat exchanger 50 incorporating a bar-plate type construction. More specifically, each of the heat exchange units 80 is provided in the form of bar-plate combination 80, one of which is shown in FIG. 6. The embodiment of FIG. 6 is somewhat more complex then that of FIG. 5 in that for each bar-plate combination 80, there are two adjacent pairs 72. In this embodiment, each bar 90 is an integral bar that includes two of the openings 82 adjacent each other at one end and separated from a U-shaped flow chamber 84 defined by the bar 90. A separator plate or sheet 91 and some braze foils 92 are provided between each of the bars 90 to form one layer of the heat exchanger 50. The openings 82 in each of the bars 90 combine with the openings 82 in every other bar 90 to define a flow manifold for the fluid 52 or 54 which is not passing through the flow chamber 84 of the bar 90. Again, for purposes of illustration, the flow regime of FIG. 6 is also illustrated and understood with reference to FIG. 4 and the prior discussion related thereto. It should be understood that the details of each construction will highly be dependant upon the particular parameters of each application, such as the flow rates, the particular fluids used for the first and second fluids 52 and 54, the inlet temperatures for the first and second fluids 52 and 54, and the desired outlet temperatures for the first and second fluids 52 and 54.

Figure 7:
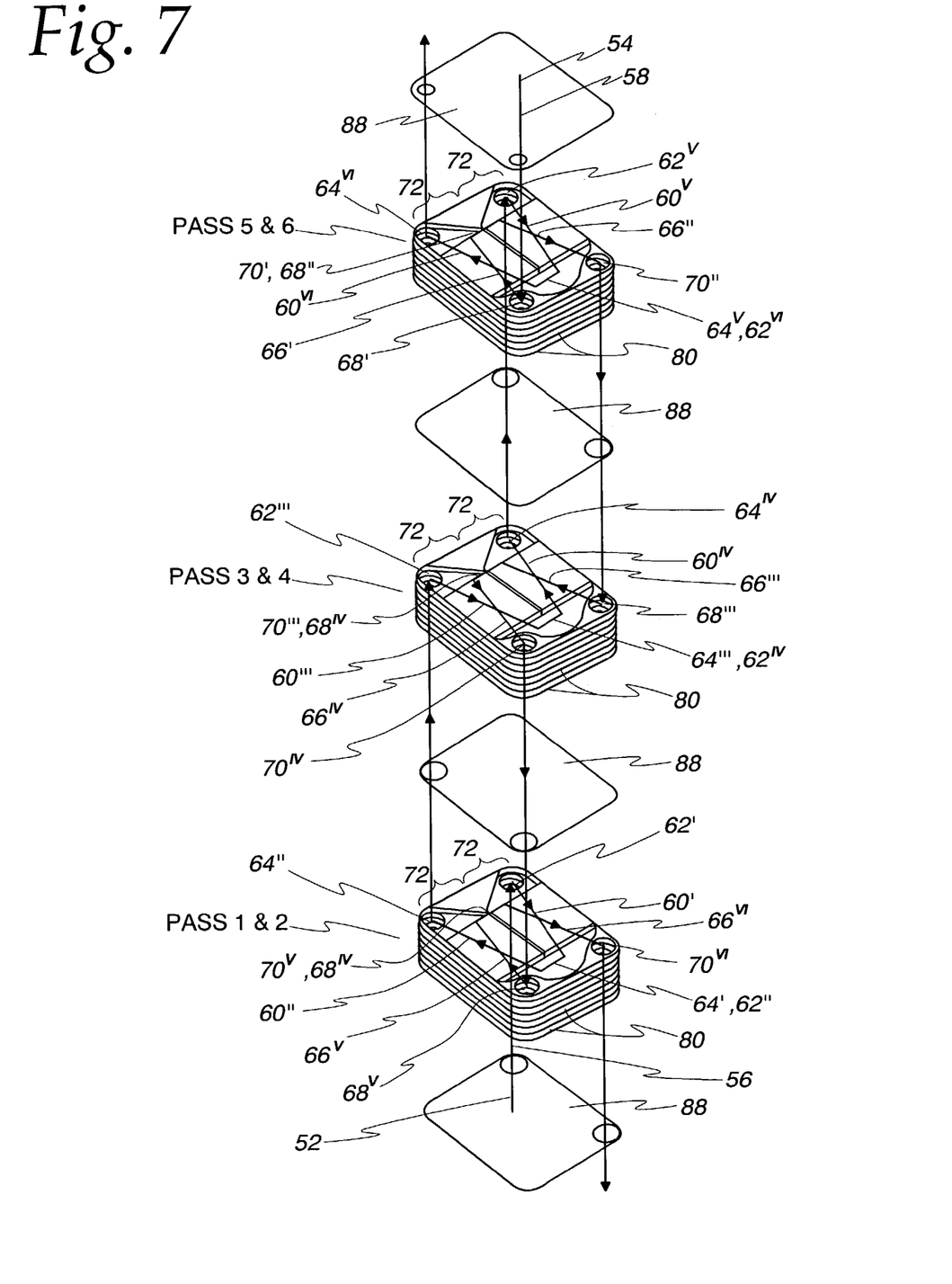
FIG. 7 is an exploded perspective view of another heat exchanger embodying the present invention utilizing multiples of the components shown in FIG. 6.
Figure 8:
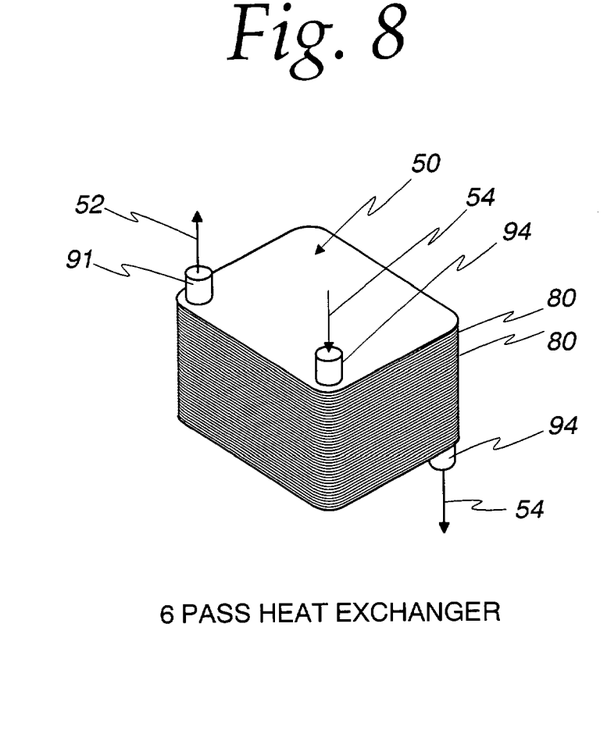
FIG. 8 is a perspective view of the heat exchanger of FIG. 7.
Figure 9:
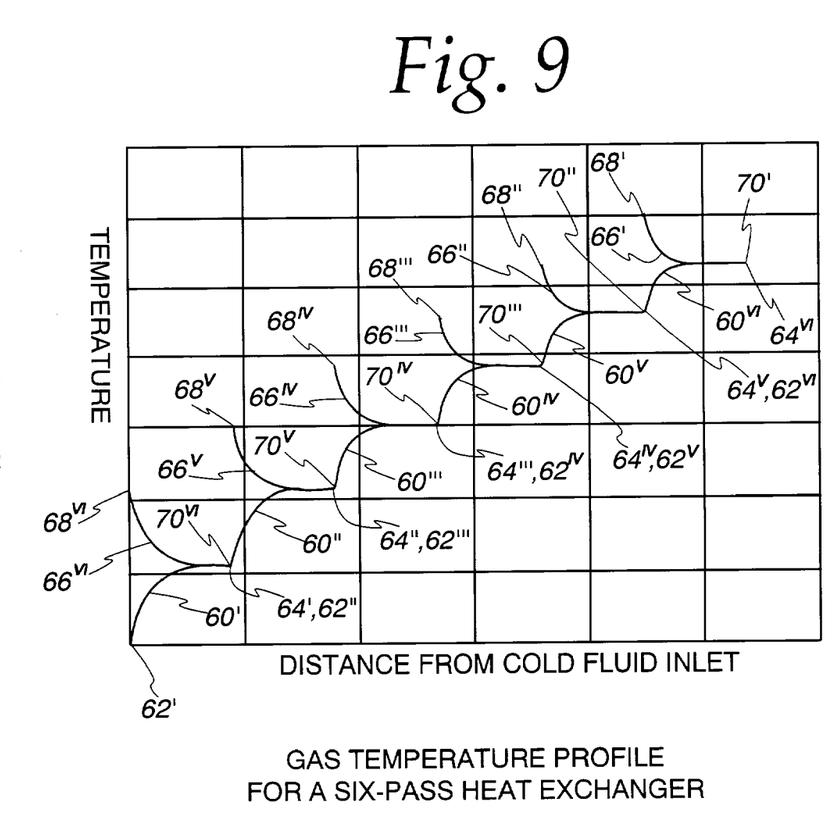
FIG. 9 is a graph illustrating the temperature versus flow path distance for the two working fluids of the heat exchanger of FIGS. 7 and 8.

FIGS. 7 and 8 illustrate how the construction of FIG. 6 can be arranged to provide six passes in one embodiment of the heat exchanger 50. As can be seen, the heat exchanger 50 in FIG. 7 has six adjacent pairs 72 made up of six of the passes 60 for the first flow path 56 and six of the passes 66 for the second flow path 58. For ease of understanding, each of the reference numbers for the passes 60 and 66, entrances 62 and 68 and exits 64 and 70 have been provided with a superscript having a roman numeral showing the order of passage for each of the respective fluids 52 and 54. As with the embodiment of the heat exchanger in FIG. 5, the embodiment of the heat exchanger in FIG. 7 provides multiple flow chambers 84 for each of the passes 60 and 66 in stacked layers of the bar-plate combinations 80, and separator plates 88 are provided to separate the flow chambers 84 of adjacent stacked layers of the bar-plate combinations 80 and to close the topmost and bottommost flow chambers 84. As best seen in FIG. 8, the heat exchanger 50 can be provided with suitable inlet and outlet fittings 94 for the first and second fluids 52 and 54. FIG. 9 is another temperature versus flow distance graph illustrating the flow regime for the embodiment of the heat exchanger shown in FIGS. 7 and 8. It can be seen from FIG. 9 that the heat transfer effectiveness of each of the pairs 72 is sufficient for the first and second fluids 52 and 54 to closely approach or attain a common temperature at the exits 64 and 70 of each pair 72 for the maximum mass flow rate. Thus, it can be seen that each of the pairs 72 "pinches" the temperatures of the first and second fluids 52 and 54 at the respective exits 64 and 70 of each pair 72. It can also be seen the first fluid 52 encounters each of the adjacent pairs 72 in an order opposite from the second fluid 54.

Figure 10:
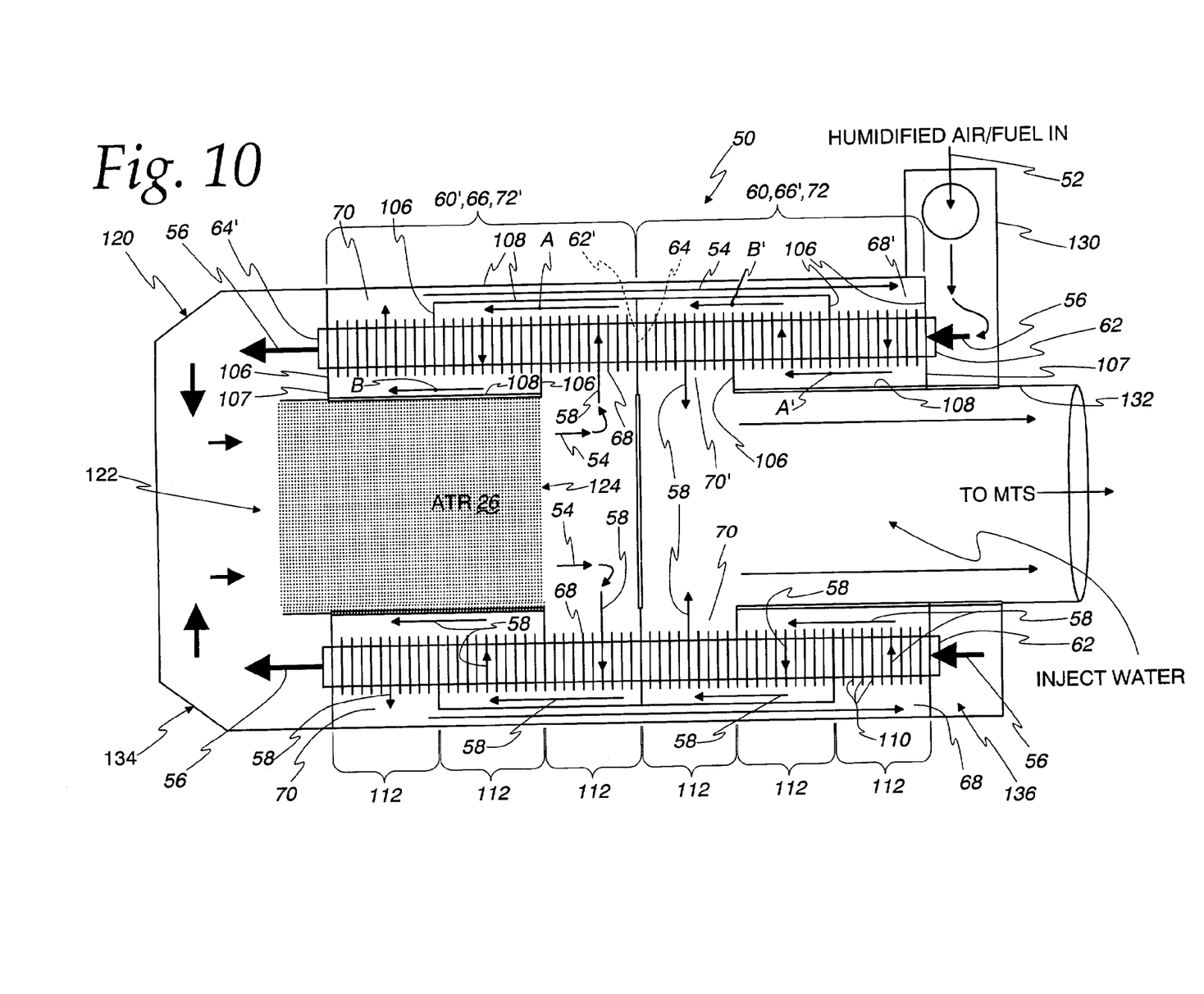
FIG. 10 is a diagrammatic illustration of another heat exchanger embodying the present invention.
Figure 11:
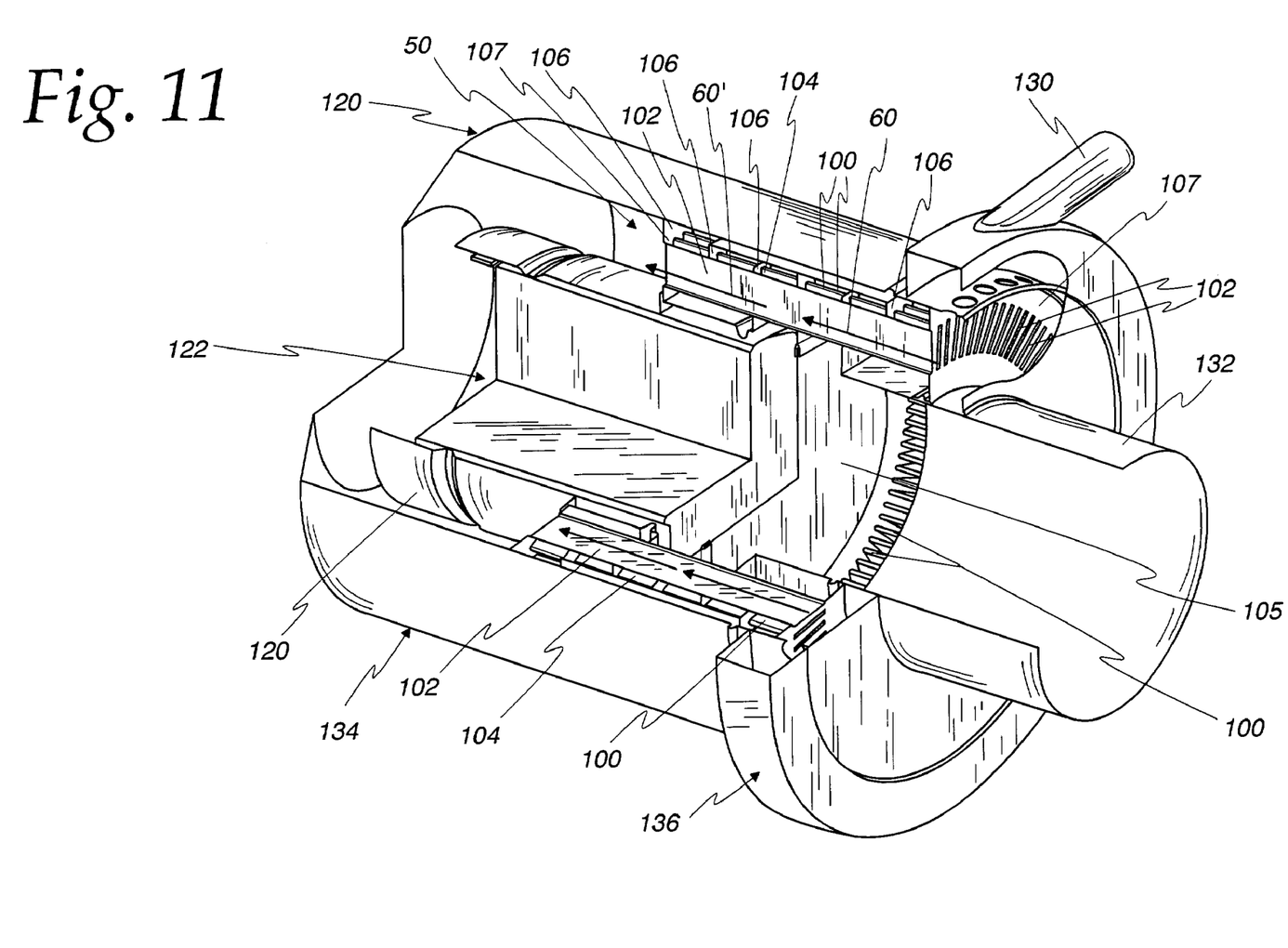
FIG. 11 is a broken, perspective view illustrating a heat exchanger construction based on FIG. 9.

FIGS. 10 and 11 illustrates another possible construction for the heat exchanger 50 that incorporates a plurality of heat exchange units provided in the form of a circumferential array of heat exchange tubes 100 having interiors 102 for receiving the first fluid 52 and exteriors 104 over which the second fluid 54 is directed by a disk shaped baffle 105, a series of annular baffles 106, and a coaxial set of cylindrical walls 108. In the illustrated embodiment, the left most and the right most annular baffles serve as header plates 107 that sealingly receive the ends of the tubes 100. Preferably, the exteriors 104 of the tubes 100 are provided with fins 110 (not shown in FIG. 11) in the form of annular shaped plate fins.

It should be appreciated that while plate fins are illustrated, it may be desirable to employ other types of fins in some applications. It can be seen that the heat exchanger 50 of FIGS. 10 and 11 includes two adjacent pairs 72 of the passes 60 and 66 of the first and second flow paths 56 and 58, with the passes 60 and 66 arranged in a concurrent flow relationship in each adjacent pair of 72 and the fluid 52 encountering each adjacent pairs 72 in an order that is opposite from the order that the fluid 54 encounters each of the adjacent pairs 72. The first pass 60 includes an entrance 62 in the form of the openings in the right hand ends of the tubes 100 and an exit 64 at a midpoint in the tubes 100, and the second pass 60' includes an entrance 62' at the midpoint of the tubes 100 and an exit 64' in the form of the openings in the left hand ends of the tubes 100. The first pass 66 includes an annular entrance 68 defined between the left hand side of the baffle 105 and the right hand side of one of the baffles 106, and an annular exit 70 defined between the right hand side of the left most baffle 106 and the left hand side of another of the baffles 106. The second pass 66' includes an annular entrance 68' defined between the left hand side of the right most baffle 106 and the right hand side of yet another one of the baffles 106, and an annular exit 70' defined between the right hand side of the baffle 105 and the left hand side of yet another of the baffles 106. The two outermost cylindrical walls 108 direct the second fluid 54 from the exit 70 of the first pass 66 to the entrance 68' of the second pass 66'. Thus, in the illustrated embodiment, each of the adjacent pairs of 72 is defined by one-half of the lengths of each of the tubes 100, the disk 105, and three of the baffles 106. It can also be seen that in each of the passes 66 the baffles 106 direct the second fluid 54 in three sub-passes, with the second fluid 54 having a localized cross flow relationship with the first fluid in each of the sub-passes 112. Thus, in addition to the overall concurrent flow relationship for the fluids 52 and 54 in each of the adjacent pairs 72, the heat exchanger 50 of FIGS. 10 and 11 also provides localized cross flow of the fluids 52 and 54. It should be appreciated that while the heat exchanger 50 shown in FIGS. 10 and 11 have three of the sub-passes 112, it may be desirable in some applications to provide heat exchangers of similar constructions without any of the sub-passes, or with more than three sub-passes by providing more of the baffles 106 in each of the passes 66.

As in previously described embodiments of the heat exchanger 50, each adjacent pair 72 of the heat exchanger 50 of FIGS. 10 and 11 is configured to provide a heat transfer effectiveness sufficient for the temperature of the first and second fluids 52 and 54 to closely approach or obtain a common temperature at the exits 64 and 70 of the adjacent pairs 72 at the maximum operating mass flow rate. Again, analysis has shown that outlet temperature of the first and second fluids 52 and 54 can be held within an acceptable temperature range for operating mass flow rates that vary by a ratio of 10 to 1.

Figure 12:
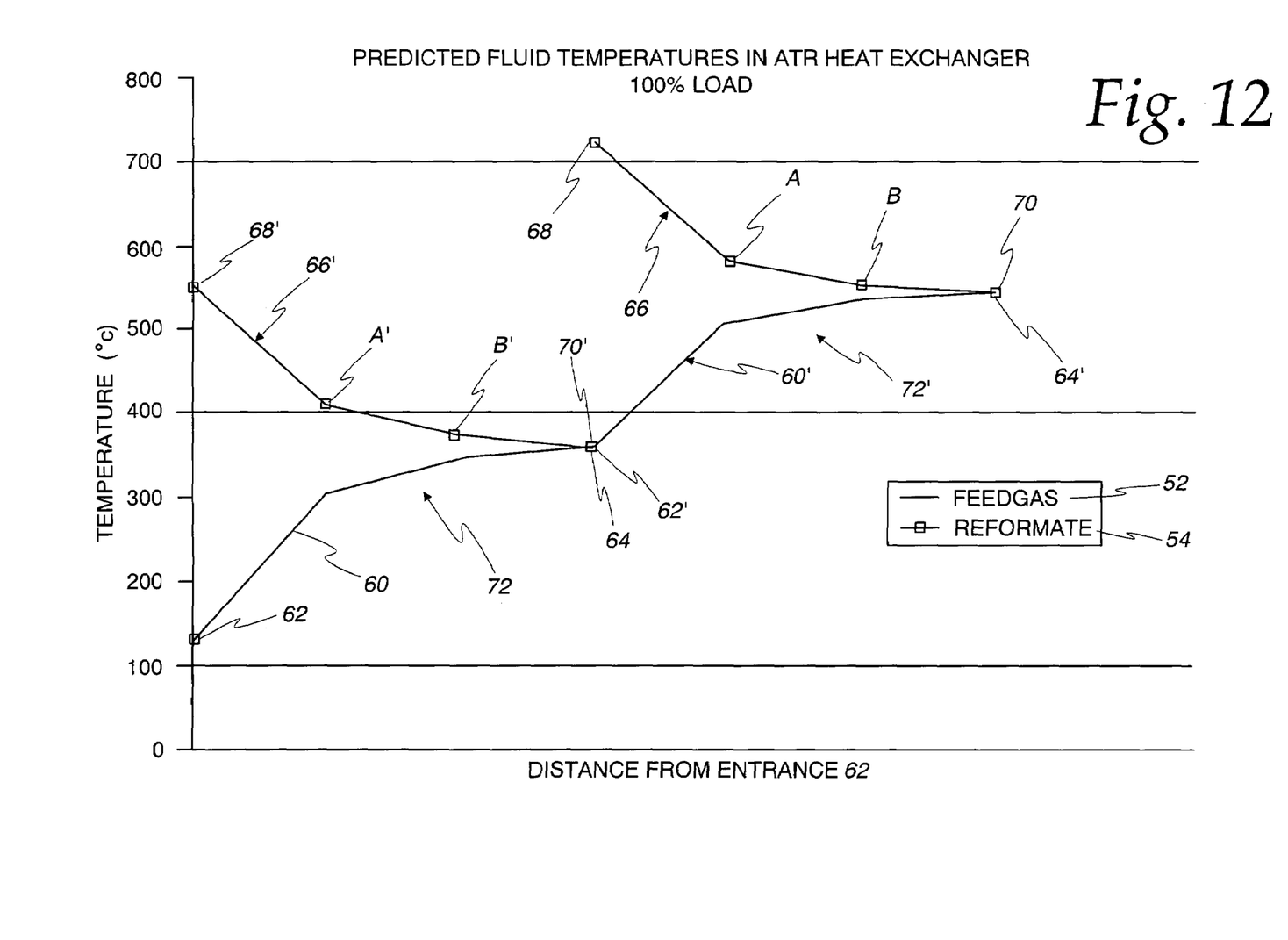
FIG. 12 is a graph illustrating the temperature versus flow path distance for the two working fluids of the heat exchangers of FIGS. 10 and 11.

The above described fluid temperature profile is perhaps best understood with reference to the graph shown in FIG. 12, which illustrates the temperatures of the first fluid 52 and the second fluid 54 as they flow through the adjacent pairs 72 and 72' shown in FIG. 10, with a reference distance from the entrance 62 shown on the horizontal axis of the graph. As seen in FIG. 12, as the first fluid 52 flows from the entrance 62 to the exit 64 and the second fluid 54 flows from the entrance 68' to the exit 70', the temperatures of the two fluids 52 and 54 closely approach or obtain a common temperature at the exits 64 and 70' of the adjacent pair 72. Similarly, it can be seen that as the first fluid 52 and the second fluid 54 flow from their respective entrances 62' and 68 to their respective exits 64' and 70, the first and second fluids 52 and 54 again closely approach or obtain a common temperature at the exits 64' and 70 of the second adjacent pair 72'. Preferably, this fluid temperature profile is achieved by designing each pair 72, 72' to achieve a maximum heat transfer effectiveness at the maximum operating mass flow rates for the first and second fluids 52 and 54, which should ensure the desired performance at all lower mass flow rates for the first and second fluids 52 and 54. It should be noted that the data points A, A', B, and B' in FIG. 12 represent the fluid temperatures at the transitions between each of the sub-passes 112 as shown in FIG. 10.

One optional and preferred feature of the heat exchanger construction shown in FIGS. 10 and 11 is that the construction 50 can be made as an integrated unit 120 with an auto-thermal reformer (ATR) 26 when employed in a fuel processing system of a fuel cell system. As shown in FIGS. 10 and 11, at least part of the ATR 26 is preferably located within one of the innermost cylindrical walls 108, surrounded by at least part of the heat exchanger 50. In the illustrated embodiments, the ATR 26 is surrounded by the final pass 60' of the flow path 56 and the initial pass 66 of the flow path 58, with an inlet 122 of the ATR connected to the exit 64' to receive the air/fuel mixture 52 therefrom and an outlet 124 connected to the entrance 68 to direct the reformate 54 thereto, as best seen in FIG. 10. While it is preferred that at least part of the ATR 26 be surrounded by at least part of the heat exchanger 50, in some applications it may be advantageous to locate the ATR 26 relative to the heat exchanger 50 such that the heat exchanger 50 does not surround any part of the ATR 26. In the illustrated embodiment, the integrated unit 120 receives the air/fuel mixture 52 via an inlet connection 130 and directs the reformate 54 from an outlet connection 132 to a medium temperature water-gas shift reactor (MTS) (not shown). In comparison to the fuel processing system 36 of FIG. 2, the fuel processing system of the integrated unit 120 eliminates the HTS 28 and the LTS 32 by utilizing the MTS. As a further option in this regard, the integrated unit 120 may be provided with water injection at its exhaust to provide additional cooling of the reformate and additional humidification of the reformate 54 for downstream reactions. The integrated unit is enclosed by a generally cylindrical housing 134 that includes an annular plenum 136 for directing the air/fuel mixture 52 from the inlet connection 130 to the heat exchanger 50.

It should be emphasized that the integration with the ATR 26 is optional for the heat exchanger 50 of FIGS. 10 and 11, and that the heat exchanger 50 can be provided without the ATR 26. Further, it should be appreciated that while the circumferential array of tubes 100 and annular baffles 106 are preferred, in some applications it may be desirable to provide the tubes in a non-circumferential arrangement with baffles of a suitable shape to direct the fluid 54 through the passes 66.

It should be understood that while several embodiments of the heat exchanger 50 have been shown, there are many possible constructions for such a heat exchanger. For example, while heat exchangers 50 having two, three, and six adjacent pairs 72 have been shown, it is possible for the heat exchanger to have as many adjacent pairs as is required to achieve the essentially constant outlet temperatures as dictated by the particular parameters of each application. In this regard, for a given set of inlet conditions (temperature, mass flow), the number N of adjacent pairs 72 determines the outlet temperatures for each of the fluids 52 and 54, assuming each pair 72 "pinches" the temperatures as previously described. It can be seen from a comparison of FIGS.

4 and 9 that increasing the number N of the pairs 72 increases the overall heat exchanger effectiveness and shifts the cold fluid 52 outlet temperature up and the hot fluid 54 outlet temperature down, thereby allowing the heat exchanger 50 to be designed to provide a desired temperature range between the inlet and outlet temperatures of the cold and hot fluids 52 and 54 by providing an appropriate number N of adjacent pair 72.

It should also be understood that, while formed, stacked plate, and bar-plate, and tube and fin examples have been shown for the heat exchange units 80, any suitable heat exchange unit can be employed if dictated to achieve the required performance for a particular application.

It should be appreciated that by providing essentially constant outlet temperature, i.e. an outlet temperature that varies over an acceptably small band for the particular application for all of the flow rates within the operating spectrum of the particular application, the recuperative heat exchanger can eliminate the need for an active control of the outlet temperatures, thereby potentially simplifying the particular application, reducing cost and complexity, and increasing reliability.

Another potential benefit of the heat exchanger 50 is that it can be designed to be relatively resistant to fouling. More specifically, since the fluids 52 and 54 approach a common temperature at the exits 64 and 70 of each pair 72, the heat exchanger 50 can be oversized without impacting the exit temperatures. Such over sizing would allow for a substantial decrease in heat transfer performance, such as by fouling, of the core without any change in the exit temperatures of the fluids 52 and 54.

Having stated a couple of the potential advantages of the heat exchanger 50, it should be understood that every embodiment of the heat exchanger 50 may not provide all or any of these stated potential advantages.

The invention claimed is:

1. A method of operating a recuperative heat exchanger that transfers heat between a first fluid and a second fluid having a maximum operating mass flow rate through the heat exchanger, the first and second fluids having mass flow rates that are substantially proportional to each other, the method comprising the steps of:
   a) flowing a first fluid through a first pass of a first flow path of the recuperative heat exchanger;
   b) flowing a second fluid through a second pass of a second flow path of the recuperative heat exchanger, the second pass of the second flow path adjacent the first pass of the first flow path and the temperatures of the first and second fluids closely approaching or attaining a common temperature at the exit of their respective passes at the maximum operating mass flow rate;
   c) flowing the first fluid through a second pass of the first flow path of the recuperative heat exchanger after the first fluid has flown through the first pass of the first flow path; and
   d) flowing the second fluid through a first pass of the second flow path of the recuperative heat exchanger prior to the second fluid flowing through the second pass of the second flow path, the first pass of the second flow path adjacent the second pass of the first flow path and the temperatures of the first and second fluids closely approaching or attaining a common temperature at the exit of their respective passes at the maximum operating mass flow rate.

2. The method of claim 1 further comprising the step of:
   e) flowing the first and second fluids through additional passes of their respective first and second flow paths.

3. A method of operating a recuperative heat exchanger that transfers heat between a first fluid and a second fluid having a maximum operating mass flow rate through the heat exchanger, the first and second fluids having mass flow rates that are substantially proportional to each other, the method comprising the steps of:
   a) flowing a first fluid through N passes of a first flow path of the recuperative heat exchanger: and
   b) flowing a second fluid through N passes of a second flow path of the recuperative heat exchanger, with the first and second passes being arranged in N adjacent pairs, the first and second fluids having a concurrent flow relationship through each of the N adjacent pairs, the temperature of the first and second fluids closely approaching or obtaining a common temperature at the exits of their respective passes in each of the N adjacent pairs at the maximum operating mass flow rate, and the first fluid first encountering a first pair of the N adjacent pairs and flowing consecutively through the adjacent pairs to the Nth adjacent pair, and the second fluid first encountering the Nth adjacent pair and then flowing consecutively through the adjacent pairs to the first adjacent pair in an order opposite from the first fluid.

4. The method of claim 3 further comprising the step of selecting the number N of adjacent pairs as a function of the desired temperature ranges between respective inlet and outlet temperatures of the first and second fluids as they enter and exit the recuperative heat exchanger.

* * * * *